United States Patent

Lundgren et al.

[15] 3,653,024

[45] Mar. 28, 1972

[54] METHOD OF SELECTED CONVERGING COMMUNICATION AND THE COMBINATION THEREOF WITH SELECTED DIVERGING COMMUNICATION BETWEEN A GROUP OF POPULATION TO A REMOTE CENTER, AND A SYSTEM FOR CARRYING OUT THE METHOD

[72] Inventors: Claes Erik Gunnar Lundgren, Stora Tvargatan 36; Istvan Janos Antal Lichtneckert, Fjelievagen 23, both of Lund, Sweden

[22] Filed: Aug. 18, 1969

[21] Appl. No.: 850,948

[30] Foreign Application Priority Data

Aug. 22, 1968 Sweden..............................11,329/68

[52] U.S. Cl.............................340/310, 235/52, 178/DIG. 4

[51] Int. Cl.........................................H04q 1/00, H04q 3/00

[58] Field of Search.....................235/52; 325/31; 178/6 PD; 340/310, 202

[56] References Cited

UNITED STATES PATENTS 2,092,120 9/1937 Hopkins..................................235/52

*Primary Examiner*—John W. Caldwell
*Assistant Examiner*—Michael Slobasky
*Attorney*—Young & Thompson

[57] ABSTRACT

A voting system for compiling a vote on alternative questions distributed by a mass medium. A vote is placed by the manual connection of a load to a public supply system, by a voter at an instant and during a period determined by a control signal transmitted from a remote center. The total load measured during this period is compared with the background load measured immediately before and/or after the period, so that the relationship of the two measurements is a measure of the number of votes. In a simple form, the device for voting may be a small box comprising the load in series with the manual switch, and a photocell controlling a relay having a switch in series with the manual switch and the load. The control signals are transmitted by television and displayed on the screen of the television receiver to activate the photocell so that the load is automatically connected to the supply if the manual switch is on.

8 Claims, 3 Drawing Figures

PATENTED MAR 28 1972 3.653,024

CLAES ERIK GUNNAR LUNDGREN
ISTVAN JANOS ANTAL LICHTNECKERT
INVENTORS

BY Young & Thompson
ATTYS.

METHOD OF SELECTED CONVERGING COMMUNICATION AND THE COMBINATION THEREOF WITH SELECTED DIVERGING COMMUNICATION BETWEEN A GROUP OF POPULATION TO A REMOTE CENTER, AND A SYSTEM FOR CARRYING OUT THE METHOD

The invention is related to a method of and a system for selected converging communication and the combination thereof with selected diverging communication between a group of the general population and a remote center. The individual subjects of said group should be able anonymously to express their opinions with respect to alternative questions or problems successively presented by mass media, any undesirable and improper influence on the procedure by the group of population must be counteracted. It is desirable that defined categories of people be selectively included or excluded from the procedure.

It is known to estimate the magnitude of a group of the population favoring one of a plurality of selectable alternatives presented by mass media. For this purpose the voters of such a group could use a diverging supply means such as electrical supply means by switching into the circuit a resistive or capacitive impedance so that variations of the consumption of electrical power could be used to obtain a representation of the attitude or opinion with respect to a certain alternative. This method is disadvantageous because any one could alter the result of such investigation of opinion in an objectionable manner by connecting to the electrical supply a load highly exceeding that which is to be used by one individual or family. An improper influence could be effected also due to the fact that persons not to be questioned could not be prevented from voting. Thus, with repeated voting, one person could act as though he were a number of persons by participating in all of the procedures instead of one only.

It is a subject of the present invention to mitigate or eliminate these drawbacks.

In a simple embodiment of the invention, when the alternative preferred by the voter occurs on a mass media, he votes by switching on or off the switch of an electrical load of predetermined power (impedance) to be connected through the switch to a power supply center. At an instant unknown to the voter and determined by the supply center (power distribution center), the open or closed load circuit is effectively connected across the power circuit and the variation of the power current by the load is measured. The measured variation of the current is then evaluated by being related with current variations measured when other voting alternatives are presented, so that the percentages of voters communicating their attitudes to the different alternatives presented through mass media may be detected and determined.

This method may be carried out by a load device comprising an electrical load and a manual switch to close or interrupt the circuit from the load to the remote supply center distributing electrical power. Furthermore, the loads must be controlled by the remote center so as to be effectively switched to the supply circuit during the shortest possible period required for measurement of the total load current, and this instant must remain unknown to the voters who also must be unable to control or to vary that instant. According to the invention, this requirement is satisfied by control means controlled from the remote center to connect the load to the supply means so that the load will consume current if the manual switch of the load is closed.

This control means may comprise a light-sensitive element such as a photocell, which is provided so that it responds to a light signal emitted by the screen of a television set to cause a switch to be closed. This switch is connected in series with the above-mentioned manual switch and may be a normally open pair of contacts of a relay or a gate controlled by the light-sensitive element through an amplifier.

If only selected categories of viewers should participate in a voting process, perhaps without knowing that they belong to a selected category, a preferred load device according to the invention may comprise a code memory such as a code-storing matrix preceding said control means for connecting the load to the remote center when the switch is closed. The code memory may be a sheet such as a disc or card provided with transparent areas or apertures, the pattern of which represents a predetermined code, and this matrix card is located in front of the aperture (effective area) of the photo sensitive element.

It may be frequently desirable to erase or to destroy the code of the code memory immediately after use thereof. This may be done by an arrangement wherein an erasing signal is received from the remote center. Such an arrangement may comprise a metal pawl or claw controlled by an electromagnet (solenoid) to be excited by a further photocell which is arranged to receive a light signal from the television screen through a particular aperture in said code matrix disc or by corresponding means if another type of code matrix is used. The coil of the electro-magnet may be connected through a normally open pair of relay contacts and a further manual switch to an exciting current source, and the energizing circuit of the relay is connected through an amplifier to said further photocell. Furthermore, the two manual switches may be ganged, that is mechanically coupled for simultaneous switching on and simultaneous switching off.

Figure 1:
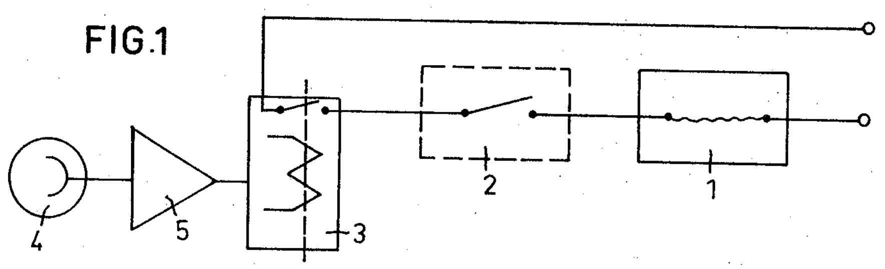
FIG. 1 is a circuit diagram of the voting circuit of the present invention.

The voting circuit shown in FIG. 1 prevents an unduly strong load from being switched into the circuit, and includes a load of predetermined resistance or impedance such as a resistor 1. In series with the resistor 1 are, a normally open pair of contacts of a relay 3 connected to a manual switch 2. In a manner known to the art, the relay is controlled through an amplifier 5 by a photocell 4 responding to a light beam from a television receiver (not shown). An optical signal may be transmitted by one of the corners of the screen of the television receiver, such signal having a minimum intensity adapted to the characteristics of the photocell.

When the device including said load 1 is to be used, it is located adjacent to the screen of the television set so that the photocell faces the screen. In due time when the number of voters is to be centrally measured, they are instructed (through the television set) to close the switch 2. Afterwards a series of optical light signals of varying intensity being lower than the predetermined response threshold of the photocell circuit is transmitted through the television set until that instant comes at which the number of voting viewers is to be counted. At this instant, the intensity of the light signal is increased to a value so that the relay contacts will be closed so that the resistor 1 is rendered effective. This occurs during a minimum period required to measure the relative increase of the power consumption by the loads being switched on as compared with the background load or power consumption which is also measured, preferably immediately before and after the activation of the loads. The proper process of voting is then initiated by instructing those who want to vote for one of the given alternative answers to close the switch, whereafter measurements are made in the way described above.

If it is desired to ensure the participation of only predetermined selected groups or categories of voters, perhaps without their own knowledge, the device may be constructed so that different categories of people are separated, preferably by code memories of the permanent store type such as permanent code matrices. These matrices may comprise a perforated disc provided with a code pattern of apertures, or cards integrated with magnetic or electrical characteristics (resistance, capacitance, circuit pattern or the like), and the code matrices are distributed to the voters. The device shown in FIG. 1 may also be provided with means for sensing the code matrix and permitting the switch to be effectively closed only if the sensed matrix code, for example said pattern of apertures, is the correct one.

Figures 2, 3:
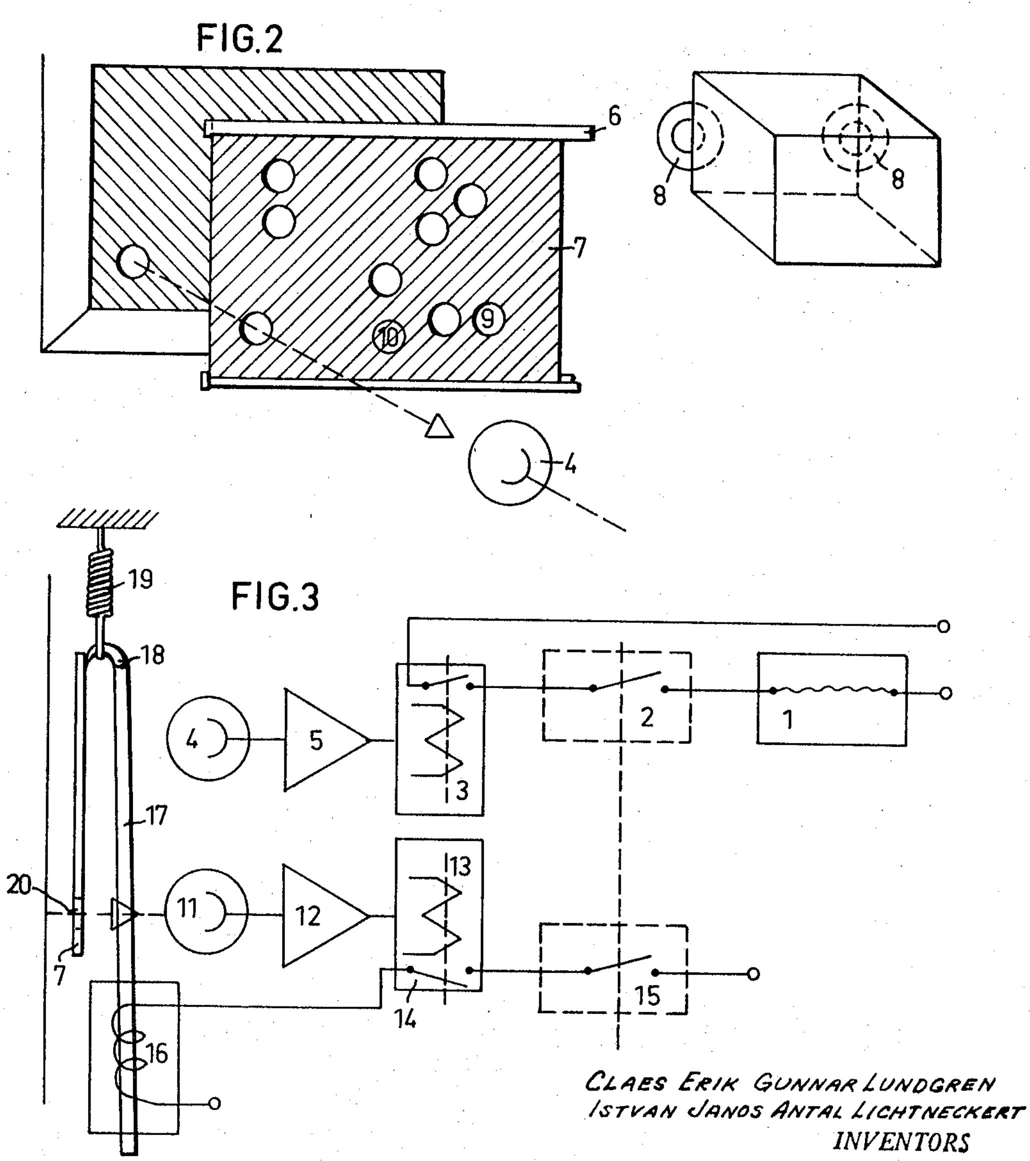
FIG. 2 illustrates a matrix to be used with the circuit shown in FIG. 1.
FIG. 3 shows a further embodiment of the voting device of the present invention.

FIG. 2 shows a frame 6 or other support carrying the photocell 4. A rigid disc or sheet may be slidingly inserted to a position well-defined with respect to the photocell 4, so that the incident light of the photocell emitted by a television receiver can be blocked. The sheet 7 forms the code matrix and is made of an opaque material provided with a pattern of transparent areas such as punched holes (apertures), the pattern representing the code. The frame may be provided with mounting elements such as suction cups 8, so that the load device can be fixed to the television screen to cover a geometrical pattern or image transmitted together with the television program as part of the picture reproduced on the television screen.

The operation of the device is as follows. The viewers of the television program are asked to insert the code means, in the present example the matrices 7, into the device. In this way it becomes possible to measure the number of people participating in the voting procedure. Then all voters are asked to switch on the manual switch 2. An optical signal is transmitted by the television sets through a hole 9 common to all matrices, so that the loads 1 of all actuated voting devices are connected to the power supply through the closed switches 2 and closed relay contacts. Now the current of the power supply is measured at the remote center. Immediately afterwards, the light signal is displaced to one of the common opaque areas of the matrices, and again the is measured. The difference between the two currents measured in this way represents the number of the group of voters provided with matrices. One of alternative problems or questions is then presented and the viewers are asked to close again the manual switch 2 if they prefer this presented alternative, i.e., if they want to vote in favor of this alternative. The transmitted optical signal is moved successively in turn to holes 10, the positions of which characterize different categories. The power variations occurring as the optical signal moves to each hole is examined by synchronous current measurements. Viewers not provided with a code matrix are eliminated by measuring the power current during a period in which the optical signal is interrupted or illuminates an opaque area of the matrices. Before starting a vote, one code matrix is sent, for instance mailed, to every viewer who should vote, the code matrix being made so that the load in each voter's voting device is switched on by the sensing means at an instant which can be varied and is determined for every individual occasion. When voting is to take place, the code card is inserted into said load device. In the most simple case, the total number of participating voters may then be determined by summation of the value of the load current related to various presented alternative replies or reactions of the viewers. The background current is measured as described above.

Sometimes it may be required to limit the ability of the viewer to influence the result of an investigation of public opinion by restricting him to, say, one vote only. This may be done by constructing the device described above with means destroying the code of the code matrix in response to a centrally transmitted signal received by the television set of the voter. FIG. 3 shows a load device comprising not only the elements 1–10 of the device shown in FIGS. 1 and 2 but also a further photocell 11. The photocell 11 is followed by an amplifier 12 and controls a relay 13 provided with a normally open pair of contacts 14 in series with a further manual switch 15. The switch 15 is actuated by the same actuating means as the manual switch 2. The switches 14 and 15 control the excitation of a further electromagnet (solenoid) 16 and thus a movable armature 17 thereof. The armature 17 has a claw 18 having a sharp-edged tip movable in the plane of the code matrix 7. A return spring 19 resets the armature to the rest position when the electromagnet 16 is deenergized.

The code matrix has an aperture 20 which permits activation of the photocell 11. When a viewer wants to vote, he inserts the code matrix into the supports frame 6, and the voting process may be executed in the way described above. If the code of the matrix is to be destroyed from said supply center, a destruction signal is transmitted and converted into an optical signal by the television set during the period in which the actuators of the switches 2 and 15 are in the closed state. Said optical destruction signal passes through the aperture 20 of the matrix 7 and activates the second photocell 11, the output of which excites the relay 13 after having been amplified by the amplifier 12, so that the contacts 14 of the relay are closed. The electromagnet 16 is now energized and attracts the armature 17 so that the armature is moved downward in the plane of the matrix 7 and the tip 18 thereof cuts or tears up the matrix. When the electromagnet is deenergized, the armature 17 is reset by the spring 19 to occupy its rest position so that the destroyed matrix may be removed and a new matrix may be inserted to be used by another voter. A matrix may be destroyed in other manners, such as by cutting or burning part of the matrix. When using a magnetic matrix such as a card covered with a magnetizable layer or printed with magnetizable spots, magnetic erasing of the code may be used. Similarly reflecting matrices for photoelectric sensing may be destroyed by removing part of (or all of) the reflecting areas or of the nonreflecting areas as the case may be. As destruction of information stored in a code memory or similar storing unit is known by the art, the above examples may suffice.

It should be noted that current measurement does not require much time and may be carried out within a fraction of a second. As the load 1 is energized by the optical signal controlling the relay 3 and need not remain energized during a period exceeding that required for measurement of the current, the load passes current during, say, less than 1 second and may consequently be dimensioned accordingly, i.e., the load 1 may be small and cheap. Furthermore, similar considerations apply to the total load on the supply lines (normally the mains), fuses and power supply means so that the total load current even from a large number of voters need not require any special measures with respect to the power supply.

What we claim is:

1. An apparatus for providing an indication at a central supply center in response to an alternative question transmitted by a mass media and received by individual television receivers at various participant's stations by varying the load on electrical supply lines extending from said supply center to a participant's station comprising an electrical load impedance, manually operated switching means connected in a circuit with said load impedance and operative to selectively close or break an electrical circuit to said load impedance, a signal controlled switching means connected in series with said manually operated switching means and said load impedance and operative in response to a control signal provided by said receiver to close an electrical circuit and in the absence of said control signal to open said electrical circuit, said manually operated switching means and said signal controlled switching means operating when simultaneously closed to connect said load impedance to said supply lines to vary the load current at said central supply center, said signal controlled switching means including a photosensitive element optically coupled to the screen of said television receiver and responsive to an optical signal reproduced on said screen, and circuit closing means activated by said photo sensitive element upon receipt thereby of an optical signal.

2. The apparatus of claim 1 wherein said photo sensitive element includes a photocell connected to an amplifier, said circuit closing means comprising a relay having an operating coil connected to said amplifier and contacts in series with said load impedance and manual switching means.

3. The apparatus of claim 1 which includes mounting means to locate a sheet between said television screen and said photosensitive element and a code sheet supported by said mounting means in the path of illumination of said photo sensitive element, said code sheet having transparent areas in a pattern representing a stored code to render said photosensitive element responsive only to a signal positioned opposite a transparent area.

4. The apparatus of claim 3 which includes signal activated destruction means operative in response to an optical destruct signal appearing on said television screen opposite a transparent area in said code sheet to render said code sheet unusable, said destruction means including a destruct photo sensitive element, electromagnetic means connected for activation by said destruct photo sensitive element and tearing means operative upon activation of said electromagnetic means to contact and damage said code sheet.

5. The apparatus of claim 4 wherein said destruct photo sensitive element includes a photocell connected to an amplifier, said destruction means including a relay coil connected for activation by said amplifier, normally open relay contacts operated by said relay coil and connected in series with a manual destruct circuit switch, an excitation source, and said electromagnetic means.

6. The apparatus of claim 5 wherein said manual destruct switch is ganged with said manually operated switching means to open and close simultaneously therewith.

7. An apparatus for providing an indication at a central supply center in response to an alternative question transmitted by a mass media and received by individual receivers at various participant's stations by varying the load on electrical supply lines extending from said supply center to a participant's station comprising an electrical load impedance, manually operated switching means connected in a circuit with said load impedance and operative to selectively close or break an electrical circuit to said load impedance, a signal controlled switching means connected in series with said manually operated switching means and said load impedance and operative in response to a control signal provided by said receiver to close an electrical circuit and in the absence of said control signal to open said electrical circuit, said manually operated switching means and said signal controlled switching means operating when simultaneously closed to connect said load impedance to said supply lines to vary the load current at said central supply center, and an exchangeable code memory means of the permanent memory type operative to render said signal controlled switching means responsive only to a signal coded in accordance with the code stored in the code memory means.

8. The apparatus of claim 7 which includes signal activated destruction means operative in response to a destruct signal provided by said receiver to destroy said code memory means.

* * * * *